Figures 1, 2:
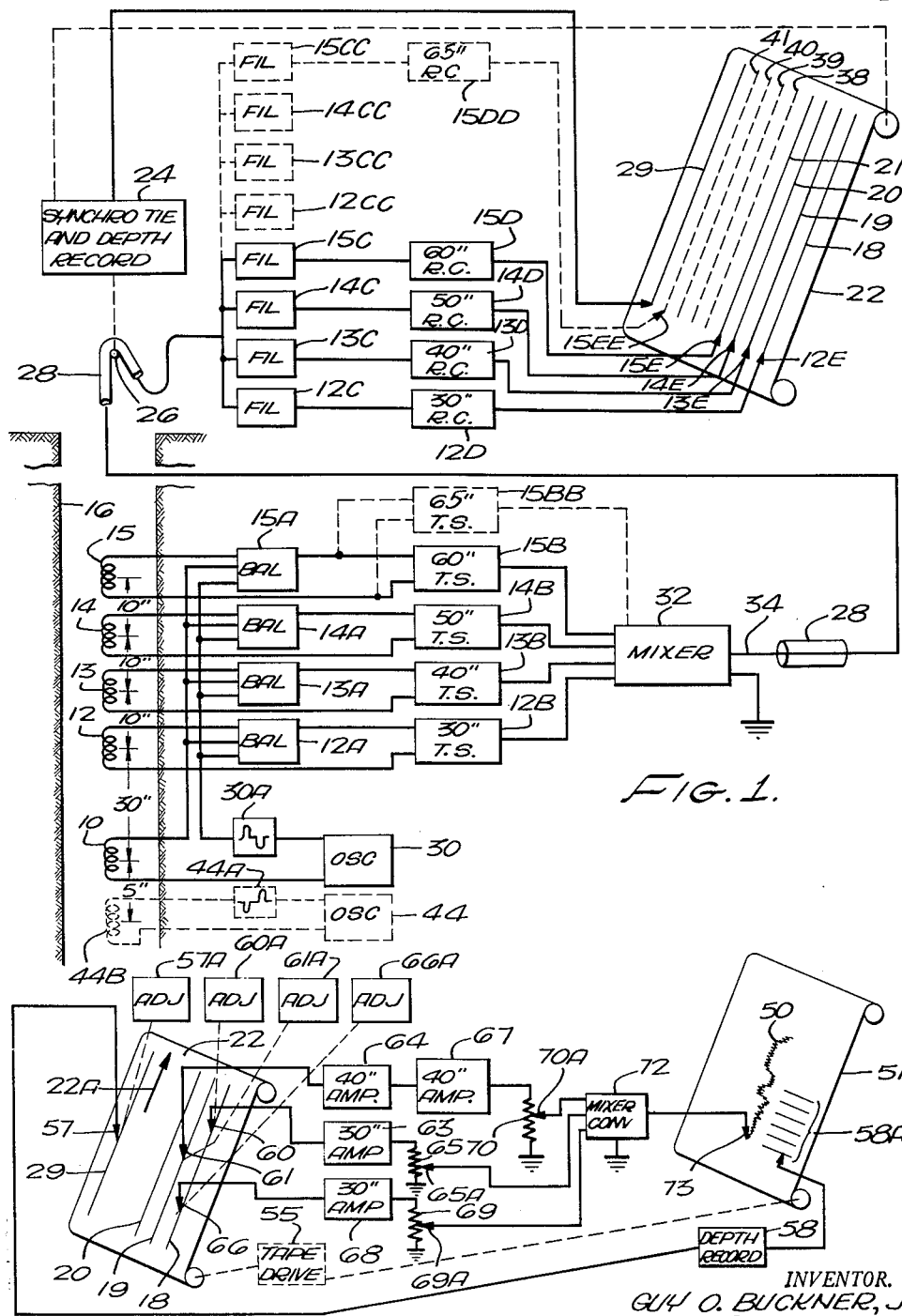

April 16, 1963   G. O. BUCKNER, JR   3,086,168
SYNTHETIC ARRAY LOGGING SYSTEM AND METHOD
Filed March 30, 1959   2 Sheets-Sheet 1

INVENTOR.
GUY O. BUCKNER, JR.
BY Lyon & Lyon
ATTORNEYS

April 16, 1963  G. O. BUCKNER, JR  3,086,168
SYNTHETIC ARRAY LOGGING SYSTEM AND METHOD
Filed March 30, 1959  2 Sheets-Sheet 2

INVENTOR.
GUY O. BUCKNER, JR.
BY Lyon & Lyon
ATTORNEYS

United States Patent Office 3,086,168
Patented Apr. 16, 1963

---

3,086,168
SYNTHETIC ARRAY LOGGING SYSTEM AND METHOD
Guy O. Buckner, Jr., Houston, Tex., assignor to Halliburton Company, a corporation of Delaware
Filed Mar. 30, 1959, Ser. No. 802,765
19 Claims. (Cl. 324—6)

The present invention relates to improved means and techniques whereby various logs, of for example, the type produced in a multi coil induction logging system may be synthesized, with the various logs so synthesized, reflecting such changes, as for example, change in coil spacing, change in number of coil turns or turns ratio, change in receiving coil polarity and other factors which enter into a multi coil induction logging system.

The term "multi coil induction logging system" has general reference to logging systems wherein a plurality of transmitter coils and/or a plurality of receiver coils are mounted in a logging tool for indicating either conductivity or resistivity of formations traversed by a bore hole in which the logging tool is moved with the transmitter coil or coils inducing voltages in the formations, and the receiver coil or coils having induced therein voltages produced by the eddy currents in the formations.

Thus, in some commercial multi coil logging systems there may be a plurality of transmitter coils spaced from each other and connected electrically to induce voltages of opposite polarity in the formations; and simultaneously therewith, there may be a plurality of receiver coils spaced from each other and connected electrically to produce the difference in their induced voltages with such difference serving as a measure of the formation conductivity or resistance.

Some disadvantages of such multi coil logging system is that the tool containing the various coils is expensive to manufacture, and after manufacture, the same cannot be changed without involving substantial reconstruction. Furthermore, it is not economically feasible to run induction logs using a plurality of logging tools in which the number of coils, their spacing and the number of turns on each are different to satisfy customer demands in various oil producing areas.

In accordance with an important feature of the present invention the results of any multi coil logging system may be assimilated by the proper use of data, taken in a single logging run, by a logging tool containing a single transmitter coil and a plurality of receiver coils having their outputs recorded individually.

It is therefore an object of the present invention to provide improved means and techniques for achieving the results indicated in the preceding paragraph.

In the furtherance of such object, a further object of the present invention is to provide a logging tool in which several two coil induction logs with various spacings between the coils is obtained in a single run through the bore hole.

Another object of the present invention is to provide means and techniques whereby the data obtained as indicated in the preceding paragraph is combined to assimilate the results of a multi coil log using the concept that (1) the effect of a change in coil turn ratio may be accomplished by changing the gain in an amplifier circuit, (2) that the effect of a change in polarity may be accomplished by changing the number of amplifiers through which a signal undergoes a 180° phase change and (3) that the effect of a change in spacing may be accomplished by changing the relative positions of reproducing heads which reproduce the separate data derived individually from the various receiver coils.

Another object of the present invention is to provide improved means and techniques whereby characteristics of earth formations may be indicated in the form of a log without movement of a logging tool.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates a new system in accordance with the present invention for recording separately the results of a plurality of two coil logging systems.

FIGURE 2 also embodying features of the present invention illustrates one manner in which a composite log may be produced from the data recorded in the system shown in FIGURE 1.

Figure 3:
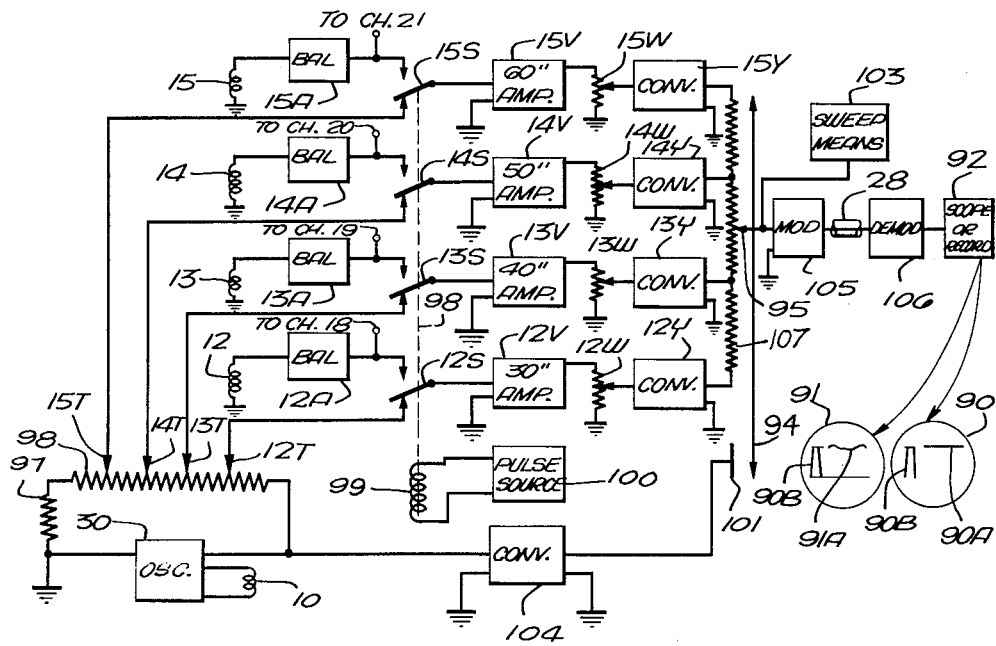

FIGURE 3 illustrates another system embodying features of the present invention.

Figures 4, 6:
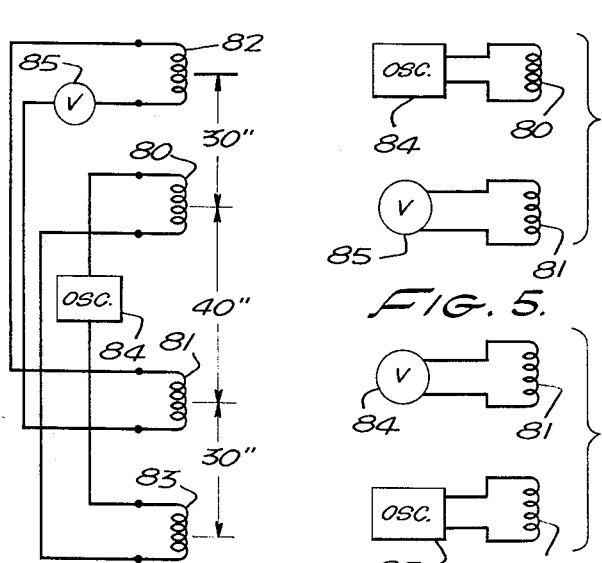

FIGURE 4 illustrtates the spacing and phase relations of coils in a multi coil logging system assimilated by the system in FIGURES 1 and 2.

Figure 5:
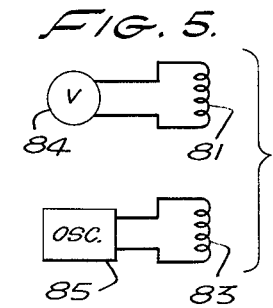
Figure 7:
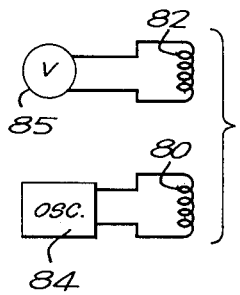

FIGURES 5, 6 and 7 are helpful in explaining the manner in which the logging system shown in FIGURE 4 is synthesized in FIGURES 1 and 2.

Referring to FIGURE 1, there is included a single transmitter coil 10 and a plurality of receiver coils 12, 13, 14 and 15, all in axially spaced relationship with their axes, coaxial with the axis of the bore hole 16, and the same are considered to be mounted in a logging tool or sonde which is caused to move in the bore hole. Information in the form of voltages induced in the receiver coils 12–15 are recorded separately or individually in corresponding individual channels 18, 19, 20 and 21 respectively on, for example, a magnetizable tape 22 which is driven synchronously or in timed relationship with the logging tool containing coils 12–15 using conventional means for that purpose represented by the synchro tie 24 in FIGURE 1. As illustrated, the recording medium 22 is driven in timed relationship with, for example, a pulley 26 over which the logging line 28 is reeled. Also, suitable means involving such synchro tie 24 is provided to effect a recording in channel 29 in the form of, for example, coded pulses representative of the depth of a predetermined reference plane in the logging tool as, for example, a plane midway between coil 10 for reasons explained later.

For example, the coils 12, 13, 14 and 15 may be spaced respectively 30, 40, 50 and 60 inches from the transmitter coil 10 and for purposes of reference the various channels through which the corresponding signals pass are designated with corresponding numbers as indicated in the drawings with the designation, T.S. meaning transmission system and the designation R.C. meaning recording channel.

The voltage induced directly by transmitter coil 10, which receives its current from oscillator 30, into corresponding receiver coils 12–15, due to the mutual inductance, oftentimes referred to as the quadrature component, is balanced out by corresponding balancing means 12A, 13A, 14A and 15A. These balancing means may each comprise a transformer having some of the transmitter coil current flowing through its primary winding for inducing a balancing or bucking voltage in the secondary winding thereof to balance out the corresponding quadrature component induced in corresponding receiver coils so that substantially only the so-called in phase or resistivity component, i.e., that component which is due substantially entirely to the eddy currents in the formation is applied to the corresponding transmission channels 12B, 13B, 14B and 15B, each having their output circuits coupled to the mixer stage 32 which in turn, has its output applied to the inner conductor 34 of the logging line 28.

The transmission channels 12B–15B, for these purposes may include subcarriers of different frequencies, which are modulated by corresponding resistivity components and such subcarriers may be applied to the mixer stage 32 which may include a carrier frequency modulated by the individual subcarriers.

These individual subcarriers are detected and demodulated at the surface using suitable equipment for that purpose at the surface, such equipment at the surface being represented, for purposes of simplicity as corresponding filtering networks 12C, 13C, 14C and 15C and recording channels 12D, 13D, 14D and 15D having their individual outputs applied to corresponding recording heads 12E, 13E, 14E and 15E for producing the corresponding in phase or resistivity recordings in channels 18–21.

The oscillator 30 operates at a frequency of, for example, 20 kilocycles per second. In some cases it is desired, as explained later, to make simultaneous recordings in response to a different frequency and in such cases the system previously described in FIGURE 1 is supplemented by the equipment indicated in dotted lines to produce simultaneously recordings 38, 39, 40 and 41 also indicated in dotted lines. In this latter instance the oscillator 44 operating at a frequency different from the frequency of oscillator 30 is connected to transmitter coil 44B which is spaced, for example, five inches below transmitter coil 10 and as explained previously the quadrature component is balanced out also using means for that purpose as indicated above. When two oscillating sources are used, then preferably filtering means indicated at 30A and 44A in series respectively with sources 30 and 44 are provided. When source 44 is of higher frequency than source 30 then the band pass characteristics of the filters 30A, 44A are as indicated in the rectangles representing the same, it being noted that filter 30A passes only the frequency corresponding to source 30 and that filter 44A passes only the frequency corresponding to source 44 and that these filters each attenuate greatly the frequency of the other source.

For purposes of simplifying FIGURE 1, the same only shows the association of receiver coil 15 with the supplementary 65 inch transmission system 15BB (corresponding to 15B) and the 65 inch recording channel 15DD (corresponding to 15D) but it is understood that the transmission systems and recording channels associated with the other three coils 12, 13, and 14 follow this same pattern.

It will be thus understood that the recordings in channels 38, 39, 40 and 41 are recordings of the in phase or resistivity component developed substantially entirely by the formation eddy currents produced at a frequency established by the frequency of oscillator 44, i.e., a frequency different from the frequency that causes the other group of recordings in channels 18–21.

FIGURE 2 illustrates one of the many different manners in which the recordings made on the medium 22 in FIGURE 1 may be combined to produce the different effects enumerated above in a log represented by the log 50 on a second recording medium 51.

In FIGURE 2 the original tape 22 which may, for example, comprise a magnetizable tape is driven in timed or synchronous relationship with respect to tape or film 51, using suitable means for that purpose. For example, tape 22 and film 51 may be driven by a common driving means 55 at the same or different speeds, preferably however such that the film 51 moves slower than tape 22, but however in corresponding relationship therewith; and the depth recording 29 previously made on tape 22 in the form of coded pulses are reproduced by reproducing means 57 and applied to suitable depth recording means 58 for photographing onto film 51 the series of indicia 58A representing predetermined depths. Processes whereby depth recordings are thus made using a printing process wherein the indicia on a prerecorded negative film is optically printed on tape 51 are well-known and have been used for this purpose.

The recording in channel 18 produces variations in the reproducing head 60 and such variations are amplified in amplifier 63 containing a single amplifying device before being applied to the potentiometer type resistance 65 having one of its terminals grounded.

A second reproducing head 66 cooperating with the same channel 18, i.e., 30 inch channel, has the variations produced therein applied to a single amplifier stage 68 containing only one amplifying device and the output thereof is applied to the potentiometer type resistance 69 having one of its terminals grounded.

A reproducing head 61 reproduces the variations or signal recorded in the 40 inch channel 19 and the same is applied successively to the two amplifying stages 64 and 67, each containing a single amplifying device before being applied to the potentiometer type resistance 70 having one of its terminals grounded.

The voltages thus appearing on each of the taps 70A, 65A and 69A of corresponding resistances 70, 65 and 69 are mixed in the mixer and converter stage 72 which has a unidirectional output applied to recording means 73 to record the log 50 which indicates the resultant of the three voltages appearing on these three taps.

It will be seen that the log 50 may be altered in many different ways to assimilate various conditions.

First, it should be noted that the phase of the voltage applied to mixer 72 depends on the number of stages through which the signal has been previously amplified, it being remembered that a signal changes its phase 180 degrees every time the signal is amplified in a vacuum tube amplifier. Thus, in the exemplification in FIGURE 2 the phase of the signal derived from track or channel 19 is reversed with respect to the phase of the signal derived in either reproducing head 60 or 66. Thus, in effect, the log 50 represents as an integral part thereof a condition wherein the receiver coils 12 and 13 are so connected in a multi log system with the outputs of such coils 12 and 13 bucking each other, i.e., with their outputs in 180 degree phase relationship. Thus the number of amplifying stages comprise a means whereby the polarity of a coil may be changed.

Secondly, it should be noted that the positions of the adjustable taps 70A, 65A and 69A determine the amplitude of corresponding signals applied to mixer stage 72. This means that the voltage induced in each receiver coil may be effectively changed with respect to its influence on the shape of log 50, and by the same token, the number of turns on each coil may thus be altered since from theoretical considerations explained more fully in by copending application Serial No. 798,624, filed March 11, 1959, the voltage in a receiver coil varies generally in direct proportion to the number of turns comprising the receiver coil. Thus, the adjustable taps 70A, 65A and 69A exemplify a means whereby the number of turns in an assimilated multi coil induction logging systems may be changed with respect to their effect on the shape of log 50, and by the same token, the turns ratio of two different receiver coils in the assimilated or synthesized log.

Thirdly, it should be noted that the relative spacing between any two coils may be effectively changed with respect to their influence on the shape of log 50. This is accomplished by adjustment of the relative positions of the reproducing heads 60, 61 and 66, a closer spacing of the same corresponding to a closer spacing of the coils being assimilated in a synthesized multi coil logging system. The means whereby the reproducing heads 60, 61, 66 may be thus adjusted along corresponding channels 18, 19 and 18 is represented by the corresponding adjusting means 60A, 61A and 66A and it will be understood that the same exemplifies a means whereby the assimilated coils may be adjustably spaced.

Fourthly, it should be noted that the reference point of measurement may also be adjusted with respect to the center of transmitter coil 10 by adjustment of reproducing head 57 along the "depth" channel 29, the means for adjusting the same being indicated at 57A; and in such case, assuming the tape drive means 55 to be ineffective under this condition as contemplated, the relative positions of the tape 22 and film 51 may be adjusted. Thus the adjusting means 57A constitutes a means whereby the reference point in a bore hole may be adjusted in the assimilated multi coil logging system.

It should also be noted that each one of these four adjustments described in the preceding four paragraphs are and may be made independently of each other.

Instead of adding all of the voltages from taps 70A, 65A and 69A in the mixer stage 72 and producing a single composite log 50, as shown in FIGURE 2, it is contemplated also that these voltages may be recorded separately on a film or tape when it is desired to produce a visual representation of the same.

The above description is perhaps made clearer by reference to FIGURE 4 illustrating a multi coil logging system which is desired to be assimilated or synthesized using the arrangements shown in FIGURES 1 and 2.

FIGURE 4 illustrates a multi coil logging system which in essence includes the main pair of coils, i.e., main transmitter coil 80 and main receiver coil 81 spaced 40 inches apart, with auxiliary 30 inch spaced coils 82 and 83 above and below, coil 82 being a receiver coil and coil 83 being a transmitter coil. It is noted that transmitter coils 80 and 83 are connected in series with oscillator 84 for producing flux of opposite polarity in the formations. Also, receiver coils 81 and 82 are connected in bucking relationship so that suitable voltage indicating means represented for purposes of illustration as voltmeter 85 indicates the difference in the in phase or resistivity component.

The signals induced or received by the 30 inch coils 83 and 82 respectively are small in comparison to corresponding signals induced by the main coils 80 and 81 respectively. This arrangement may be used for good thin bed definition, with the results obtained being influenced only to a small extent by bore hole mud.

An analysis of the arrangement shown in FIGURE 4 reveals that essentially the net response is that due to the sum of the response of the main 40 inch pair and the two 30 inch pair as indicated in FIGURES 5, 6 and 7, it being noted that the voltage induced in auxiliary receiver coil 82 by auxiliary transmitter coil 83 is small in comparison to the voltages produced in FIGURES 5–7.

The response of the arrangement shown in FIGURE 4 is thus a summation of the responses of FIGURES 5, 6 and 7. It is considered substantially immaterial as to whether the coil pair of FIGURE 6 and/or the coil pair of FIGURE 7 is a part of the logging sonde since the same may be considered to be located at different distances and corrected for depth before their respective responses are combined with the response obtained in FIGURE 5 to obtain the net response in FIGURE 4.

As indicated previously, the response of the auxiliary 30 inch auxiliary pairs may be subtracted from the response of the main 40 inch pair either by reversing the leads to the coils as in FIGURE 4 or by passing the voltage of the 30 inch pairs 81, 83 and 82, 80 through one more stage of amplification than the voltage derived from the 40 inch pair 80, 81 to obtain a 180 degree phase relationship before combining the signals in an adding or mixing circuit 72 (FIGURE 2).

Thus, in accomplishing this result it is noted that the response of the 40 inch pair 80, 81 corresponding to the 40 inch spaced pair 10, 13 in FIGURE 1 and the corresponding recording 19 in FIGURE 2 and also the response of the 30 inch pairs 81, 83 and 82, 80 corresponding to recording 18 are played back in FIGURE 2 at different depths, i.e., the reproducing heads 60, 61 and 66 are not aligned in a direction perpendicular or transverse to the direction of tape movement indicated by arrow 22A.

In other words, the net voltage recorded in FIGURE 2 corresponds to a recording of the 40 inch spaced pair less (because of amplifier 67) the sum of the 30 inch recording 18 produced by reproducing means 60 located at a position corresponding to 35 inches above the 40 inch spaced pair and the 30 inch recording 18 produced by reproducing means 66 located at a position corresponding to 35 inches below the 40 inch spaced pair. Stated also in different words, reproducing means 61 reproduces the condition shown in FIGURE 5, reproducing means 60 reproduces the condition shown in FIGURE 7 and reproducing means 66 reproduces the condition illustrated in FIGURE 6, and the proper subtraction corresponding to the bucking relationship of the coils shown in FIGURE 5 is accomplished by providing the single additional amplifier 67 in FIGURE 2.

The dimension of 35 inches above and 35 inches below is referenced with respect to a reference line or plane midway between the main coils 80 and 81 corresponding to coils 10 and 13 in FIGURE 1, and corresponds to one-half the distance between main coils 80 and 81, i.e., 20 inches plus one-half the distance between coils 80 and 82 i.e., 15 inches, and correspondingly one-half the distance between coils 81 and 83 i.e., 15 inches. In some cases it may be desired to produce indications with respect to a different reference line or plane other than midway between main coils 80 and 81 as in a system previously indicated wherein the individual voltages on taps 70A, 65A and 69A are recorded separately in which case the reproducing head 57 (FIGURE 2) may be adjusted to a different position with respect to reproducing head 60 and if desired reproducing heads 60 and 66 may be also readjusted. Thus, as shown, the tape 51 is controlled by the depth pickup head 57 such that the output recording or log indicates depth in a fixed relation to the original recording on tape 22. When, as described above, the original recording on tape or film 22 is made with respect to the center of coil 10, the depth reference may be changed in FIGURE 2 with reproducing heads misaligned by 20 inches, i.e., reproducing head 57 is moved up in FIGURE 2 a distance corresponding to a 20 inch distance in the bore hole with respect to reproducing head 60 with the relative positions of heads 60, 61 and 66 remaining unchanged.

As indicated previously, the formations may have induced therein currents of two different frequencies established by oscillators 30 and 44 in FIGURE 1 for studying or indicating the effect of frequency in a multi coil logging system using means and techniques described above or in some cases for studying or indicating the effects of two asymmetrically spaced transmitter and receiver coils in a multi coil system assuming that in this last instance that the frequencies are sufficiently close together and produce substantially the same effects in the formations. Also, by using different transmitting coils operating at different frequencies the number of receiver coils may be reduced, i.e., the addition of the single transmitter coil 44B has the effect of the addition of four more receiver coils, each spaced five inches with respect to corresponding receiver coils 12, 13, 14 and 15.

FIGURE 3 illustrates a modified system in simplified form for producing a visual presentation of the character illustrated at 90 and 91 on a cathode ray tube or scope 92 with, for example, the logging tool remaining stationary in the bore hole or traveling at a relatively small speed in comparison to the rate at which the series of switches 12S, 13S, 14S and 15S are operated while simultaneously scanning of a conductor or electron beam indicated at 95 in the direction indicated by the double arrow 94 progresses at a relatively high rate.

The same oscillator 30, oscillator coil 10 and balancing means 12A–15A are associated with each receiver coil 12, 13, 14, 15 in the same manner as in FIGURE 1. In this case, however, the oscillator 30 is also connected in series with a voltage dividing circuit including the serially connected resistances 97 and 98, the resistance 98 having a series of taps 12T, 13T, 14T and 15T, adjustable for calibration purposes, which are connected to a corresponding stationary contact of single pole, single throw switches 12S–15S respectively. The other stationary contact of these switches having applied thereto respectively the in phase or resistivity component of the coils 12–15. The movable contacts of switches 12S–15S are ganged as indicated by the dotted line 98 for simultaneous movement by, for example, a relay coil 99 energized by a pulse source 100 for recurrently operating the series of switches 12S–15S, which art used for calibration.

The movable switch arms are connected respectively to corresponding amplifying means 12V–15V located in the bore hole which thus alternately amplify the output of the receiver coils and corresponding adjusted voltages established by taps 12T–15T.

The output of amplifying means 12V–15V is applied to a corresponding series of potentiometer resistances 12W–15W across which corresponding signals are developed. The A.C. voltages appearing on the adjustable taps on these resistances are converted into a unidirectional voltage in corresponding converters 12Y–15Y which have their unidirectional outputs connected to different points on resistance 107. The taps on resistances 12W–15W are adjusted so that the voltages on each (in a homogeneous formation condition) are progressively higher in that order. For example, the gain setting of the tap or resistance 13W is higher than the setting of the tap on resistance 12W.

The electrical connector 95 indicated as a resistance tap is recurrently swept over such resistance 107 and a target electrode 101 by sweep producing means indicated at 103 which may, for example, be a sixty-cycle synchronous motor.

This target electrode 101, for purposes of providing a calibrating pulse, has a predetermined D.C. potential established by converting in converter 104 an A.C. voltage derived from the oscillator 30.

The unidirectional voltage signal thus developed on the tap 95 during its recurrent movement modulates a carrier in modulator stage 105 having its modulated output transferred over logging line 28 to surface equipment which includes the demodulator 106, the unidirectional output of which is applied to the Y deflection axis of the scope 92. The time base sweep of such scope is synchronized by a synchronizing pulse 90B which operates the sweep means 103 in the bore hole so that such time base sweeps are synchronized with movement of the tap 95.

Thus, when the movable arms of switches 12S–15S are in their lower position, the scope 92 produces the calibration presentation indicated at 90A; and when such movable arms are in their upper positions, a presentation exemplified at 91A is produced by the scope 92. The persistency of the screen of the scope 92 is made sufficiently long so that an observer may see both presentations 90A and 91A simultaneously on the same screen for comparison purposes.

For these purposes, the taps 12T–15T are so adjusted that the portion 90A is substantially a horizontal straight line, the other portion 90B, in the form of a calibrating pulse is the same in both cases and is produced when and as the tap 95 engages the target electrode 101, the same being accomplished irrespective of the position of switches 12S–15S. The other variation 91A which is due to the character of the formations being observed, studied or indicated is thus indicated with respect to the pre-established horizontal portion 90A.

The height of the calibration pulse 90B corresponds to a predetermined conductivity. In accordance with at least theoretical considerations which are detailed in my above mentioned copending application Serial No. 798,624 the in phase or resistivity component of the voltage induced in the receiver coils as a result of eddy currents flowing in a homogeneous formation varies generally in inverse proportion to their spacing from the transmitter coil. Thus to produce the straight line portion 90A, the gains of the receiver coil amplifier circuits are adjusted accordingly; and this in general involves the adjustment of taps 12T–15T and adjustment of taps on resistances 12W–15W. Thus, in homogeneous formation, the presentation 91A would also be a straight line corresponding to line 90A and coinciding therewith. Any variations in homogeneity are thus indicated by deviations of trace 91A from being parallel with the straight line 90A. Such deviations vary linearly with formation conductivity, the particular magnitude of which can be ascertained by interpolation using a linear scale factor established by the calibrating pulse 90B.

Thus, in FIGURE 3 the straight line 90A may be considered to be a graph in which the ordinates are apparent conductivity and the abscissae are distances measured along the bore hole; and this straight line represents conditions in a homogeneous formation while curve 91A represents conditions in non-homogeneous formations. The calibration pulse 90B corresponds to a predetermined voltage applied to target electrode 101 based on measurements or theoretical considerations and may, for example, correspond to approximately a voltage representing 50 millivolts for a formation conductivity of 10 milli ohms per meter.

The system shown in FIGURE 3 may also be alternately used in conjunction with the recording 22 in which case the reproduced outputs of channels 18, 19, 20 and 21 are applied respectively to corresponding upper stationary contacts of switches 12S–15S as indicated in FIGURE 3. In such case the reproducing heads for these channels are all positioned with respect to tape movement to provide alignment with respect to a common depth reference of the subsurface tool and the tape 22 moves at a relatively small speed compared to the high rate at which the scanning indicated at 84 occurs; and also, of course, the same patterns 90B and 90A may be produced using in this instance an oscillator comparable to oscillator 30 in FIGURE 3.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a bore hole logging system in which a transmitter coil induces eddy currents in ambient formations and such eddy currents in turn induce voltages in a plurality of receiver coils, the improvement which resides in recording quantities representative respectively of different voltages induced in said receiver coils in individual recordings and combining information derived from the individual recordings.

2. In a bore hole logging system wherein a transmitter coil induces eddy currents in ambient formations and such eddy currents in turn induce voltages in a plurality of receiver coils, the improvement which resides in making individual recordings each corresponding to a recording of the voltage induced in the corresponding receiver coil, reproducing the individual recordings to derive corresponding voltages, combining said voltages to produce a combined voltage and recording said combined voltage.

3. A system as set forth in claim 2 in which a second transmitter coil induces currents in the ambient formations at a frequency different from the eddy currents produced by the first mentioned transmitter coil, said second transmitter coil causing the induction of additional voltages in said receiver coils, the additional steps comprising making individual recordings of each of said additional voltages induced in corresponding receiver coils, reproducing said recording to derive other voltages representative of said additional voltages, combining said other voltages with said combined voltage and making a single recording in accordance with said combined voltage and said other voltages.

4. In a bore hole logging system wherein a transmitter coil induces eddy currents in ambient formations and such eddy currents in turn induce voltages in a plurality of receiver coils, the steps comprising making individual recordings of corresponding voltages induced in corresponding receiver coils, reproducing the individual recordings at different reference points to produce corresponding reproduced voltages, combining said reproduced voltages to produce a combined voltage, and recording said combined voltage.

5. The method as set forth in claim 4 involving the additional step of inverting the polarity of one of said reproduced voltages prior to combining the same with the other reproduced voltages so that said combined voltage includes the effect of said polarity inverted reproduced voltage.

6. In an induction bore hole logging system wherein a transmitter coil induces eddy currents in ambient formations and such eddy currents in turn induce voltages in a plurality of receiver coils, the combination comprising means for producing a single recording representative of the combined voltages induced in said receiver coils, said means comprising means for effectively changing the spacing of said receiver coils by predetermined adjustment of the effect of said induced voltages to said recording.

7. In an induction bore hole logging system wherein a transmitter coil induces eddy currents in ambient formations and such eddy currents in turn induce voltages in a plurality of receiver coils, the combination comprising means for producing a recording representative of the combined voltages induced in said receiver coils, said means including means whereby the polarity of one of said receiver coil voltages is inverted before being combined with the other receiver coil voltages.

8. An arrangement as set forth in claim 7 including means for adjusting the effect of said receiver coil voltages to said recording whereby the effective spacing between individual receiver coils is adjusted.

9. In an induction bore hole logging system wherein a transmitter coil induces eddy currents in ambient formations and such eddy currents in turn induce voltages in a plurality of receiver coils, the combination comprising means for producing individual recordings representative of each of the voltages induced in corresponding receiver coils, means for reproducing said individual recordings to produce the corresponding receiver coil voltages, means for making a composite recording of said reproduced receiver coil voltages, the last mentioned means including means for adjusting the effect of each of said voltages induced in said receiver coils to said composite recording whereby effectively the spacing between receiver coils is adjusted.

10. An arrangement as set forth in claim 9 in which the last mentioned means includes means whereby the polarity of the voltage of a particular one of said receiver coil voltages is inverted prior to making said composite recording.

11. In an induction bore hole logging system wherein a transmitter coil induces eddy currents in ambient formations and such eddy currents in turn induce voltages in a plurality of receiver coils, the steps comprising making individual recordings of corresponding voltages induced in said receiver coils, reproducing said recordings to produce signals representative of corresponding receiver coil voltages and altering said signals to achieve the effect of different receiver coil spacings, and recording said signals so altered.

12. In an induction bore hole logging system wherein a transmitter coil induces eddy currents in ambient formations and such eddy currents in turn induce voltages in a plurality of receiver coils which are mounted rigidly in spaced mechanical relationship with each other and with respect to said transmitter coil, means for producing a recording of said voltages induced in said receiver coils, said means including means whereby effectively the spacing of said receiver coils is altered by adjusting the effect of said induced voltages to said recording by altering the polarity of certain of said induced voltages.

13. In a bore hole logging system wherein a transmitter coil induces eddy currents in ambient formations and such eddy currents in turn induce voltages in a plurality of receiver coils, first recording means effective to produce individual recordings of the voltages induced in corresponding receiver coils on a recording medium, second recording means comprising a plurality of adjustable reproducing heads adjustably mounted with respect to corresponding recordings on said recording medium, said second recording means comprising a phase inverting amplifying means and variable gain means effective to produce a composite recording on a second recording medium of a voltage which is the composite of the voltages recorded on said first recording medium and which are subjected to said phase inverting means and said variable gain means.

14. A method as set forth in claim 4 involving the additional step of controlling the amplitude of one of said reproduced voltages prior to combining the same with the other reproduced voltages so that said combined voltage includes the effect of changing the number of turns of a corresponding receiver coil.

15. A system as set forth in claim 12 in which said producing means includes means whereby effectively the number of turns of a receiver coil is altered by predetermined adjustment of the amplitude of said induced voltages.

16. In a system of the character described wherein individual signals are produced representative of voltages induced in corresponding receiver coils, the combination comprising a storage means adapted to store individual signals from said coils, read-out means adapted to reproduce selected ones of said signals from said storage means, individual signal channels having corresponding ones of said signals from said read-out means applied to the inputs thereof, the output of said channels being coupled to common impedance means, visual indicating means, means scanning said common impedance means and developing a composite voltage representative of the selected signals in selected ones of said channels, means applying said composite voltage to said visual indicating means, said visual indicating means including time base deflection means for sweeping a cathode ray beam in a first direction while said composite voltage serves to simultaneously deflect said cathode ray beam in a second direction which is perpendicular to said first direction.

17. A system as set forth in claim 16 in which at least one of said channels includes means whereby the gain of the signal passing therethrough may be adjusted and also includes means whereby the polarity of a signal passing therethrough may be inverted.

18. A system as set forth in claim 16 including means controlled by said scanning means for producing a calibration pulse in said visual indicating means.

19. A system as set forth in claim 1 in which the recordings of voltages induced in the individual receiver coils are produced simultaneously with a depth recording of depth of the coils in a bore hole, and said depth recording is used in orienting a composite recording made in accordance with the voltages induced in said receiver coils.

References Cited in the file of this patent

UNITED STATES PATENTS

| | | |
|---|---|---|
| 2,220,070 | Aiken | Nov. 5, 1940 |
| 2,642,477 | Puranen et al. | June 16, 1953 |
| 2,782,364 | Shuler et al. | Feb. 19, 1957 |
| 2,790,138 | Poupon | Apr. 23, 1957 |
| 2,842,735 | Martin | July 8, 1958 |
| 2,882,988 | Dobrin | Apr. 21, 1959 |
| 2,884,589 | Campbell | Apr. 28, 1959 |